March 19, 1929.  J. PALMER  1,706,250
BEVERAGE FILTER
Filed April 24, 1928
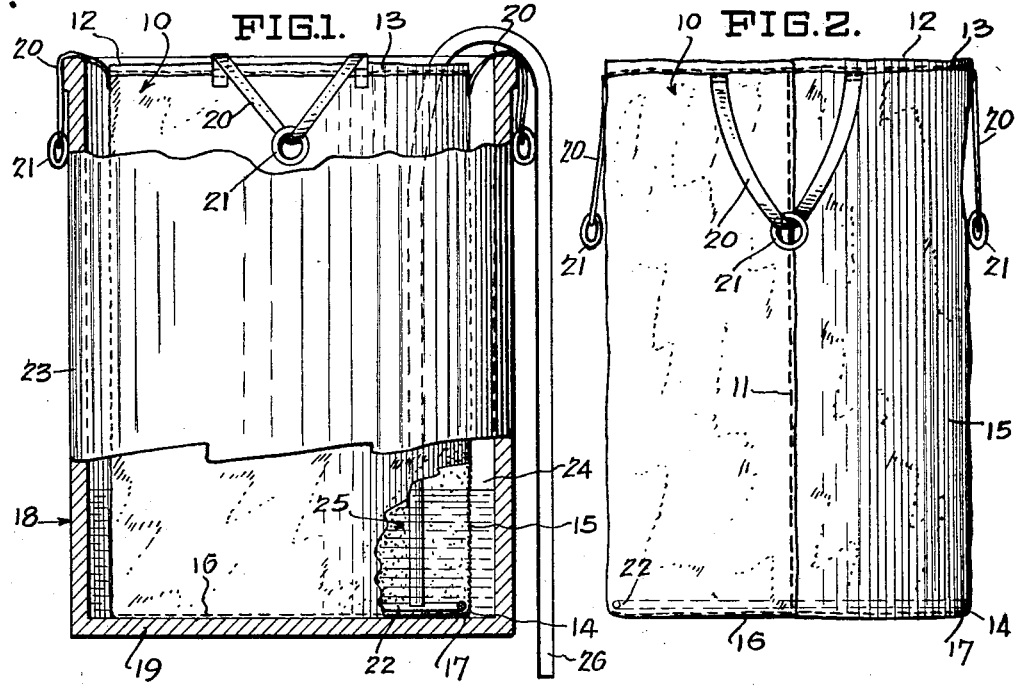
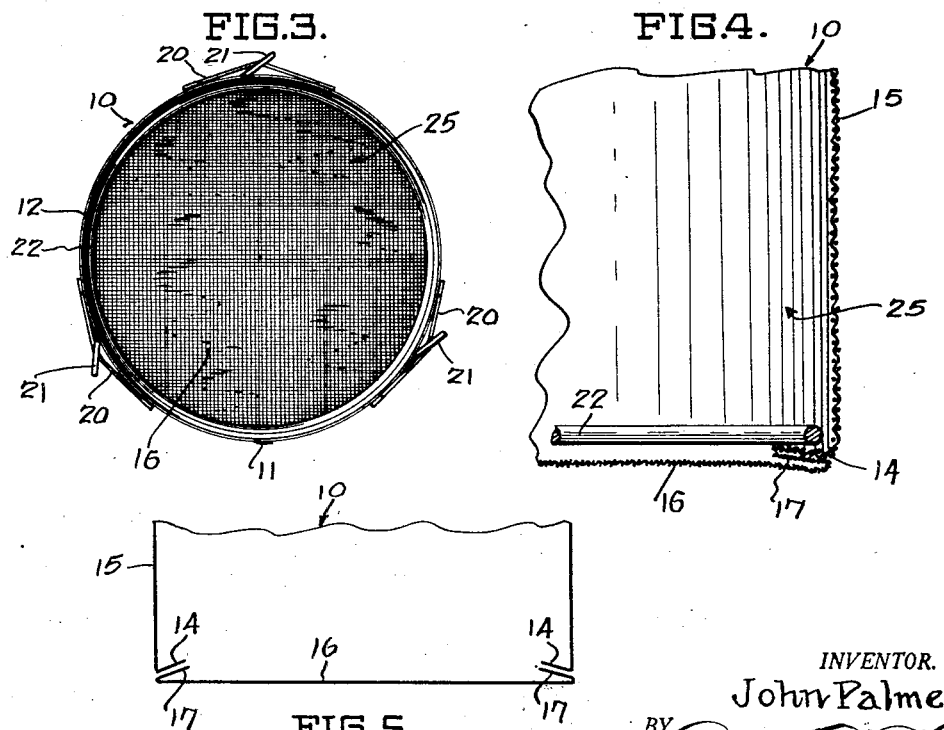
INVENTOR.
John Palmer.
BY
ATTORNEY Patented Mar. 19, 1929.

1,706,250

UNITED STATES PATENT OFFICE.

JOHN PALMER, OF SAN FRANCISCO, CALIFORNIA.

BEVERAGE FILTER.

Application filed April 24, 1928. Serial No. 272,504.

The present invention relates to improvements in filtering devices, and more particularly to those applying the principle of infiltration of the exterior liquid through the walls of the filtering medium to its interior, rather than, as in common practice, from the filtering medium's interior outwardly through its walls, a practice less calculated for satisfactory removal from a liquid of its suspended highly comminuted foreign particles, where the weight of a column of liquid is ever acting as a force to urge the liquid outwardly through the walls, than is that where infiltration is employed, the action here being gradual and uniform and practically without liquid column urge, since submergence of filter progresses gradually through the body of the liquid to be filtered and the infiltration accompanies this submergence, thus insuring against the forcing of suspended matter together with the liquid through the filter walls, the residuum being left behind as a sludge and the thus clarified liquid siphoned-off as it accumulates.

The primary object of my invention is to produce a filter for filtering beverages, comprising a body of any suitable filtering material and of cylindrical form, having a flat bottom of substantially waterproof material forming an integral part thereof and so arranged and constructed that its specific gravity will be only sufficiently above that of the liquid to be filtered as to insure its sinking gradually to the bottom of the liquid's container, the cylindrical side walls only acting to filter as their submergence progresses.

Another object of the invention is to provide a filter for filtering beverages that, when placed in a liquid body will absorb through capillary attraction sufficient liquid to cause it to gradually descend to the liquid container's bottom, with its bottom resting thereon and its mouth supported by the container's mouth and its side walls in spaced relation to the container's interior walls, its submergence being assisted by means of a metal ring carried by the filter's bottom.

A further object of the invention is to provide a filter of the character designated, of cylindrical form having its upper edge provided with weighted retaining members so arranged that they will be suspended outwardly from the upper edge or lip of the container and hold the filter in upright position therein.

An additional object of the invention is the provision of a filter for filtering beverages that will accomplish the filtering of the liquid through directly immersing the filter therein, thus obviating the necessity of handling the liquid the second time, as is required when the ordinary filtering method is employed.

In the accompanying drawings, constituting a part of this specification, and in which like characters of reference refer to similar parts, throughout:

Figure 1 is a side elevation, partly in section, of a beverage container, in which is shown in place therein, in readiness for use, my improved filter;

Figure 2 is a view per se of the filter, showing its general conformation, together with its dependent retaining members, these being stitched, or otherwise secured, to its upper edge;

Figure 3 is a plan view of the filter per se, showing the arrangement of the weighted retaining members about the filter's body;

Figure 4 is an enlarged sectional detail of the lower corner of the filter, showing the method of stitching the side wall to the bottom thereof, also the metal ring resting on this bottom to provide weighted means for overcoming buoyancy of filter to cause it to descend more speedily through the liquid; and Figure 5 is a diagrammatic view illustrative of the method of securing the bottom to the side walls of the filter.

Referring to the drawings more particularly and in detail, the numeral 10 indicates in a general way the filter, constituted of outing flannel, or like close woven material, cut to form, folded over with edges in overlapped relation and stitched by a line of stitching 11, with upper end 12 left open, and hemmed as indicated at 13. The lower edge 14 of the material, forming the cylindrical side wall 15, is turned in and around the bottom, this being preferably formed of a suitable waterproof material 16, with outer edge 17 turned in to match the turned in edge 14 of the filter body and stitched thereto, the walls and bottom as thus formed constituting a cylindrical member adapted for immersion as a filter in a container 18, with its bottom 16 resting upon the bottom 19 of the container and its upper edge, constituting the mouth 12, substantially on a level with the upper edge of the container's mouth.

The means for retaining the filter in upright position consists of a plurality of dependent loops 20 arranged in spaced relation about the upper edge of the filter's walls 15, with their free ends securely stitched thereto and each bearing a weight 21 of metal and of ring or washer form.

A metal ring 22 of a diameter equalling that of the cylindrical body and of a required weight is placed in the bottom 16 of the filter to decrease its buoyancy and to assist in its more rapid descent to the container's bottom 19, as well as to maintain the walls 15 in distended relation and spaced apart from the interior walls 23 of the container to insure an intervening annular space 24 therebetween, as shown in Figure 1.

If it be desired to filter the beverage content of a container, my filter 10 is held bottom down over the open top end of the container and dropped therein together with the ring 22, the weighted loops 20 being allowed to suspend themselves about and without the exterior surface of the container, the weight of the ring 22 causing the gradual descent of the filter through the liquid body and consequent infiltration through the wall thereof until its bottom has reached and rests upon the container's bottom 19, this decrease in filter's buoyancy being further added to by a certain measure of capillary attraction exercised by the cylindrical wall of the container 15. As is obvious, as the filter descends, the liquid in the container space 24 is transferred, by infiltration through its cylindrical wall, to the filter's interior 25, until the bottom has been reached, when it will be found that practically all the liquid first without the filter has been transferred to within the filter, leaving behind a precipitated residuum. The filtered liquid within the interior 25 of the filter may be readily drawn off to a second vessel through the action of a siphon 26, after the usual manner.

Having thus described my invention, I claim, and desire to secure by Letters Patent:

1. Filtering means of the class described, comprising a cylindrical-shaped fabric body portion, such as outing flannel, having a stitched-in bottom section of tightly-woven substantially waterproof material, a metal ring carried by said bottom section, and a plurality of weighted loops carried by the upper end of the body for the purpose of adjustably supporting said filter body in upright position in a suitable container.

2. Filtering means in combination with a container of liquid, of a cylindrical body portion of comparatively closely woven material having edges overlapped to form a side seam and a stitched-in bottom of tightly-woven material, the material of said bottom being considerably heavier than that constituting the sides, a metal ring carried by the bottom constituting a weight to assist in the descent of the filter through the liquid body, and weighted loops carried by the upper end of said body portion and resting upon the upper edge of the container with the weights suspended therewithout for the purpose of maintaining the filter in upright position therewithin.

In testimony whereof I hereunto affix my signature.

JOHN PALMER.